(12) United States Patent
Goodwin (10) Patent No.: US 10,321,674 B1
(45) Date of Patent: Jun. 18, 2019

(54) REMOTE CONTROL DECOY

(71) Applicant: Easton Goodwin, Madill, OK (US)

(72) Inventor: Easton Goodwin, Madill, OK (US)

(*) Notice: Subject to any disclaimer, the term of this patent is extended or adjusted under 35 U.S.C. 154(b) by 261 days.

(21) Appl. No.: 15/204,553

(22) Filed: Jul. 7, 2016

Related U.S. Application Data (60) Provisional application No. 62/189,465, filed on Jul. 7, 2015.

(51) Int. Cl.
*A01M 31/06* (2006.01)

(52) U.S. Cl.
CPC .................. *A01M 31/06* (2013.01)

(58) Field of Classification Search
CPC .................................................. A01M 31/06
USPC ........................................................... 43/2, 3
See application file for complete search history.

(56) References Cited

U.S. PATENT DOCUMENTS

| 3,026,545 | A | | 3/1962 | Brainard, II | |
|---|---|---|---|---|---|
| 3,074,195 | A | * | 1/1963 | Vanderpool | A01M 31/06 43/26.1 |
| 3,689,927 | A | | 9/1972 | Boston | |
| 4,612,722 | A | | 9/1986 | Ferrell | |
| 5,377,439 | A | | 1/1995 | Roos et al. | |
| 6,601,333 | B2 | | 8/2003 | Cicoff et al. | |
| 7,975,421 | B2 | | 7/2011 | Ware et al. | |
| 8,146,285 | B1 | | 4/2012 | Jones et al. | |
| 2004/0025770 | A1 | * | 2/2004 | Saunoris | A01M 31/00 114/144 A |
| 2009/0188148 | A1 | * | 7/2009 | Orris | A01M 31/06 43/3 |
| 2011/0067289 | A1 | * | 3/2011 | Lane | A01M 31/06 43/3 |
| 2011/0113672 | A1 | * | 5/2011 | Holmberg | A01M 31/06 43/2 |
| 2015/0059227 | A1 | * | 3/2015 | Kubinec | A01M 31/06 43/2 |
| 2015/0059229 | A1 | * | 3/2015 | Miller | A01M 31/06 43/3 |
| 2016/0205921 | A1 | * | 7/2016 | Janzen, Jr. | A01M 31/06 |

OTHER PUBLICATIONS

Retrieval Decoy. Product Listing [online]. Horizon Hobby, Inc., 2012 [retrieved on Apr. 21, 2015]. Retrieved from the Internet: http://www.proboatmodels.com/Products/Default.aspx?ProdID=PRB3650.

* cited by examiner

*Primary Examiner* — Peter M Poon
*Assistant Examiner* — Danielle A Clerkley
(74) *Attorney, Agent, or Firm* — Cramer Patent & Design, PLLC; Aaron R. Cramer (57) ABSTRACT

A duck decoy provides a remote controlled motorized propulsion system and interchangeable retrieval devices used to capture and push additional decoys or downed waterfowl toward a hunter. The duck decoy effectively retrieves decoys and downed waterfowl to the hunter while located at a remote location, thereby minimizing the need to use a boat or a dog.

16 Claims, 7 Drawing Sheets

REMOTE CONTROL DECOY

RELATED APPLICATIONS

The present invention was first described in and claims the benefit of U.S. Provisional Application No. 62/189,465 filed Jul. 7, 2015, the entire disclosures of which are incorporated herein by reference.

FIELD OF THE INVENTION

The present invention relates generally to the field of decoys and more specifically relates to a remote control decoy.

BACKGROUND OF THE INVENTION

Waterfowl hunting is the practice of hunting ducks, geese, or other waterfowl for food and sport. Waterfowl can be hunted in crop fields where they feed, or, more frequently, on or near bodies of water such as rivers, lakes, ponds, swamps, sloughs, or oceanic coastlines.

There are several items used by almost all waterfowl hunters: a shotgun, ammunition, a hunting blind, decoys, a boat, and a duck or goose call. Decoys are one of the most important pieces of equipment for the waterfowler. Using a good spread of decoys and equally good calling, an experienced waterfowl hunter can successfully 'bag' ducks or geese if waterfowl are flying within proximity that day. Modern decoys are typically made from molded plastic and are placed in the water about thirty to thirty-five yards (30-35 yds.) from the hunters in typical hunting situations.

The purpose of the decoys is to lure the desired birds within shooting range while hunter is concealed nearby behind a blind. When a hunter or hunters sees the waterfowl, he or she begins calling with the duck or goose call. Once the birds are within range, the hunters rise from the blind and quickly shoot the birds before they are frightened off. After shooting the bird, a hunter must then retrieve the waterfowl from the ground or water. Dogs and boats are used by hunters for retrieving the birds. However, dogs may be temperamental and boats may be costly. This is not ideal therefore a suitable, cost-effective, and reliable solution is desirable.

Various attempts have been made to solve problems found in decoy art. Among these are found in: U.S. Pat. Nos. and U.S. Pat. App. Pub. No. 8,266,836; 7,975,421; 5,377,439; 3,689,927; and 2011/0113672. These prior art references are representative of decoys.

None of the above inventions and patents, taken either singly or in combination, is seen to describe the invention as claimed. Thus, a need exists for a reliable remote control duck decoy, to avoid the above-mentioned problems.

SUMMARY OF THE INVENTION

The disadvantages of the prior art are overcome by the present invention in providing an a decoy, comprising a flotation device which has an upper hull and a lower hull having a decoy power source secured inside, a shell which is attachable to an upper surface of the flotation device which has a clip detent formed within a center front end thereof and a camera mount which is superjacent to the clip detent, a first propeller assembly which is secured within the upper hull, a second propeller assembly which is secured within the upper hull and positioned on an opposing rear perimeter end of the upper hull from the first propeller assembly, a retrieval assembly which is attachable to a front center location of the upper hull and is capable of being positioned above the water line, a receiver control module which is secured upon the upper surface of the flotation device and beneath the shell which is in electrical communication with a decoy power source, the first propeller assembly and the second propeller assembly and a remote control which has a remote control power source secured inside. The remote control is capable of being in wireless communication with the receiver control module and is configured to selectively control the first and second propeller assemblies. In a separate embodiment the retrieval assembly is capable of being positioned below the water line.

The flotation device may comprise of a pair of straps which each have a top end secured within opposing rear perimeter sides of the shell, a latching rail located along a top side edge portion the upper hull, a pair of strap hooks integral with a bottom end of each strap, a shell clip projects perpendicularly from a front end of the upper surface of the flotation device correspondingly shaped to the clip detent, a post which is subjacent to the shell clip and projects perpendicularly from the front end of the lower hull and an antenna projecting from a rear upper surface of the flotation device which is in electrical communication with the receiver control module. Each strap hook removably secures the shell to the flotation device when each strap hook is secured to an exterior edge portion of the latching rail. The shell clip also removably secures the shell to the flotation device when the shell clip is engaged within the clip detent.

The first and second propeller assemblies may each comprise a motor mount which is secured beneath the upper hull and subjacent to the receiver control module and a motor housing secured subjacent and perpendicular to the motor mount. The motor housing may further comprise a motor which is in electrical communication with the receiver control module, a motor shaft which has a first end in mechanical communication with the motor and a second end which projects through a distal end of the motor housing and a propeller which is in mechanical communication with the motor shaft second end and a cage which is secured over the distal end of the motor housing and likewise over the propeller.

The remote control may comprise of a housing which has a front surface and which retains the remote control power source inside. The power source is in electrical communication with at least one circuit board and an RF transmitter. The remote control may also comprise of a first propeller control which is secured upon the front surface and in electrical communication with at least one (1) of the circuit boards, a second propeller control which is secured upon the front surface and in electrical communication with the at least one (1) of the circuit boards and is adjacent to the first propeller control, a power switch which is in electrical communication with at least one (1) circuit board, a trim control which is in electrical communication with the at least one (1) circuit board, an antenna which is secured upon a top surface of the housing and in electrical communication with the at least one (1) circuit board, a mobile telephone compartment which is secured with the front face and is subjacent the first propeller control and the second propeller control and a pair of clips which are secured opposite each other within the mobile telephone compartment and adjacent a perimeter edge of the mobile telephone compartment. When the remote control is activated, the first propeller control, the second propeller control, and the trim control enable wireless communication with the first propeller assembly and the second propeller assembly via a wireless signal. The wireless signal is generated by the RF transmitter and transmitted by the antenna to the receiver control module in response to data from the at least one (1) circuit board, thereby permitting control of a given speed, direction, and trim of the decoy. A mobile telephone is capable of being removably secured within the mobile telephone compartment by the pair of clips.

The retrieval assembly may comprise a right arm, a left arm, a socket and a locking pin. The right arm and the left arm may be positioned in an open divergent manner at each distal end, each of which are biased towards each other. The right arm and the left arm may also simultaneously be positioned in a closed divergent position at each proximal end, the divergent position secured either superjacent or subjacent to the socket depending on the embodiment. The socket is removably secured within the post by the locking pin and the retrieval assembly is capable of gathering and retrieving an item therein.

The right and left arms may further comprise an open mesh expanded metal material. There may also be a weight compartment secured within a rear portion of the upper hull. The shell may further comprise a bird shape. The decoy power source may comprise of at least one (1) battery, each being secured within a housing having an opening subjacent to the upper surface of the flotation device and a lid which is removably secured over the opening and is superjacent to the upper surface of the flotation device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

10 remote control decoy
11 shell
12 strap
13 strap hook
14 camera mount
16 flotation device
18 upper hull section
19 lower hull section
21 latching rail
25 antenna
27*a* shell clip
27*b* clip detent
30*a* first retrieval assembly
30*b* second retrieval assembly
31*a* right arm
31*b* left arm
35 post
36 socket
38 locking pin
40*a* first propeller assembly
40*b* second propeller assembly
41 cage
42 motor mount
43 propeller
44 motor
45 motor housing
46 motor shaft
47 weight compartment
48 latching door
50 remote control unit
51*a* first propeller control
51*b* second propeller control
52 remote control housing
53 remote control power switch
55 trim control
58 controller antenna
60 wireless signal
62 mobile telephone compartment
64 mobile telephone
66 clip
70 receiver/control module
71 module housing
72 battery compartment
74 battery
76 decoy power switch
78 battery compartment lid
80 battery compartment latch
82 wiring
90 fastener
100 water surface

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a remote control decoy (herein described as the "apparatus") 10, which provides a remote controlled hunting decoy 10 with bird retrieval capabilities. The apparatus 10 provides a duck-shaped decoy shell 11 affixed to a flotation device 16 which includes a motor 44 driven propulsion system and interchangeable semicircular shaped retrieval assemblies 30a, 30b. The retrieval assemblies 30a, 30b are used to capture and push downed waterfowl toward a hunter. The apparatus 10 provides for remote deployment of the shell 11 as well as retrieval of static decoys and downed waterfowl.

Figure 1:
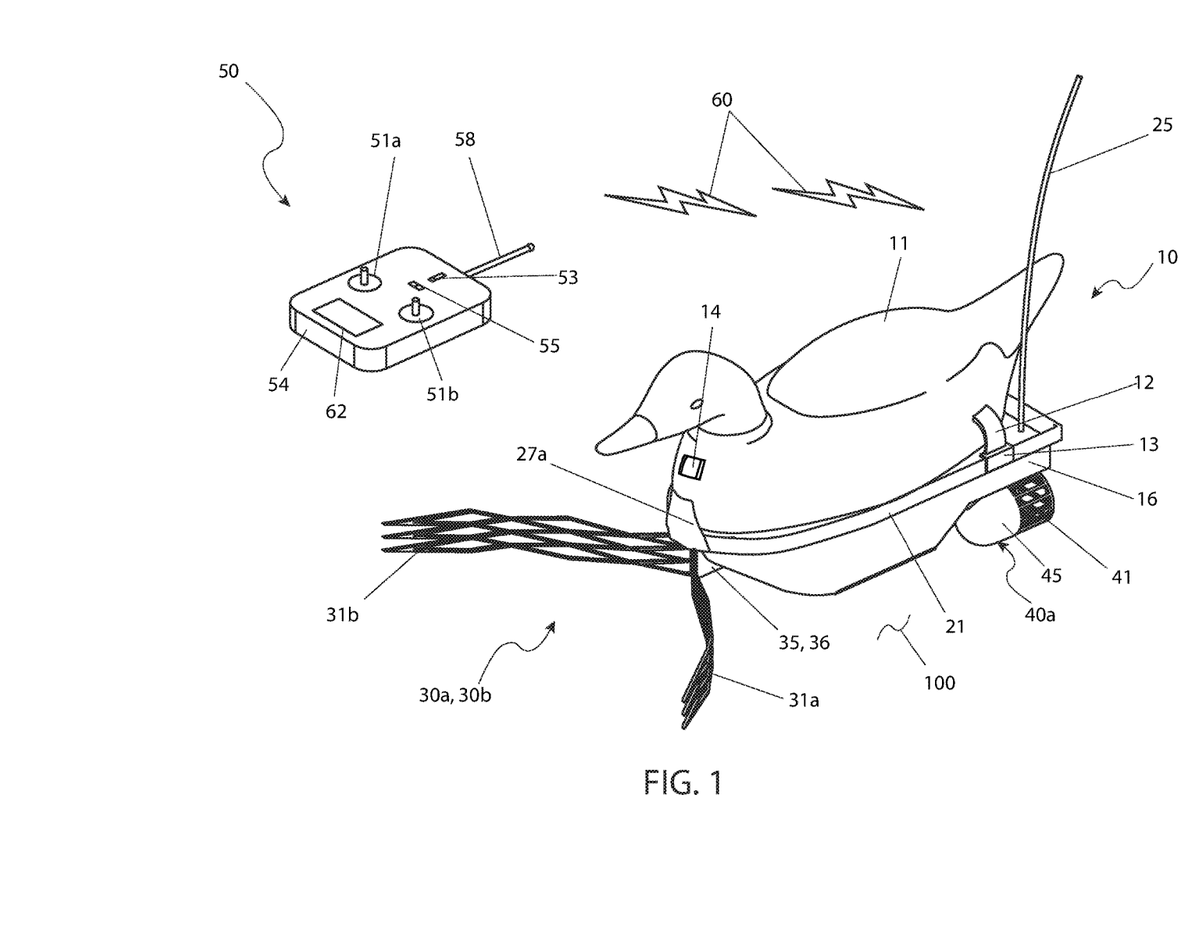
FIG. 1 is a perspective view of a remote control decoy 10, according to an embodiment of the present invention.

Referring now to FIG. 1, a perspective view of the apparatus 10 according to an embodiment of the present invention, is disclosed. The apparatus 10 includes a plastic shell 11 shaped and colored to resemble a duck, being preferably formed of plastic or other suitable material. The shell 11 further includes an integral clamp-type camera mount 14 along a front portion which enables removable attachment of devices such as a GOPRO® camera or similar device.

The shell 11 is configured in size, shape, and coloring to resemble a duck to attract the waterfowl. The shell 11 is removably attached all along a bottom edge portion to a subjacent rigid plastic flotation device 16 shaped in the form of a boat hull. Attachment of the shell 11 and the flotation device 16 is accomplished via engagement of an integral shell clip portion 27a of the flotation device 16 and a plurality of straps 12. The shell clip 27a would be an inverted hook-shaped appendage being integrally-molded into a front edge of the flotation device 16. The shell clip 27a engages, and is retained within a correspondingly-shaped clip detent 27b formed into a front edge portion of the shell 11 (also see FIG. 4). The flotation device 16 provides stability for the apparatus 10 as it is maneuvered across a water surface 100. The flotation device 16 may comprise material to make it buoyant or enable a buoyant material to be attached thereto.

The apparatus 10 provides forwardly extending first retrieval assembly 30a or second retrieval assembly 30b portions. The retrieval assemblies 30a, 30b are used to encompass and guide downed waterfowl through the water and toward a hunter until the hunter can safely collect it. The retrieval assemblies 30a, 30b allow a hunter to gather and retrieve waterfowl from difficult to access locations, thereby minimizing the need to use a boat or dog (see FIGS. 2a, 2b and 2c).

Each retrieval assembly 30a, 30b includes right arm 31a and a left arm 31b portions. The arms 3a, 31b are normally configured in a divergent open condition as seen here. The conversion point of the arms 31a, 31b terminates in a connection socket 36 that is removably attachable to a post portion 35 of the flotation device 16 in a non-rotating manner.

The floatation device 16 resembles a miniature boat hull having a wide upper hull section 18 having a perimeter shape which emulates that of the shell 11. Integral to and extending downward from the upper hull section 18 is a lower hull section 19. The lower hull section 19 provides a smooth profile from front to rear to allow the apparatus 10 to move smoothly across obstacles present within the water surface 100 such as weeds, sand, and the like. (see FIGS. 2a, 2b and 2c).

Propulsion and directional control of the apparatus 10 is provided by a pair of propeller assemblies 40a, 40b and a hand-held remote control unit 50. The propeller assemblies 40a, 40b are integrated into the construction of the lower hull 19 and include respective electric motors 44, as well as a motor housing 45 and open grid cage 41 portions which are integrally-molded into the flotation device 16. User interface is provided by the remote control unit 50 which transmits a wireless signal 60 to a receiver/control module 70 located within the flotation device 16 (see FIGS. 2a, 4, and 5).

Figure 2A:
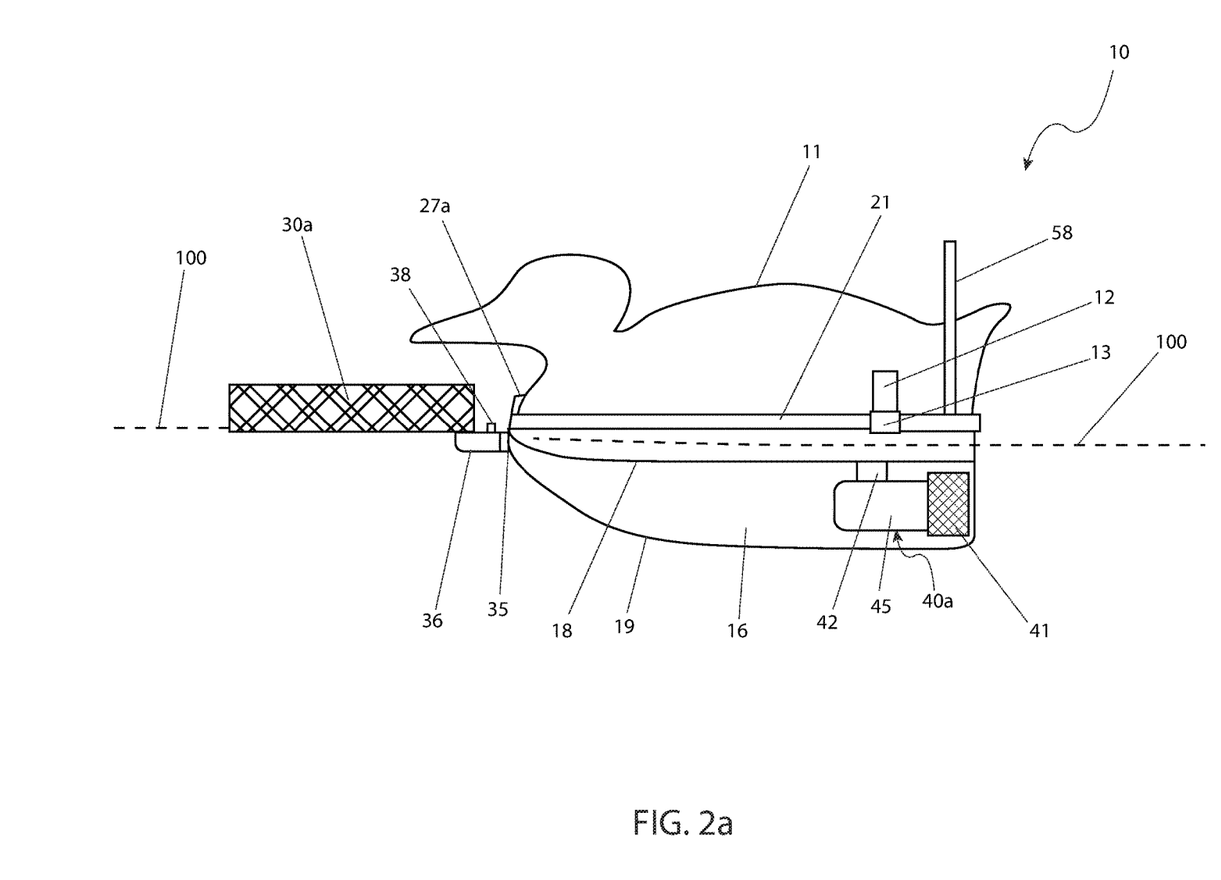
FIG. 2*a* is a side view of the remote control decoy 10 being configured with a first retrieval assembly 30*a* portion, according to an embodiment of the present invention.
Figure 2B:
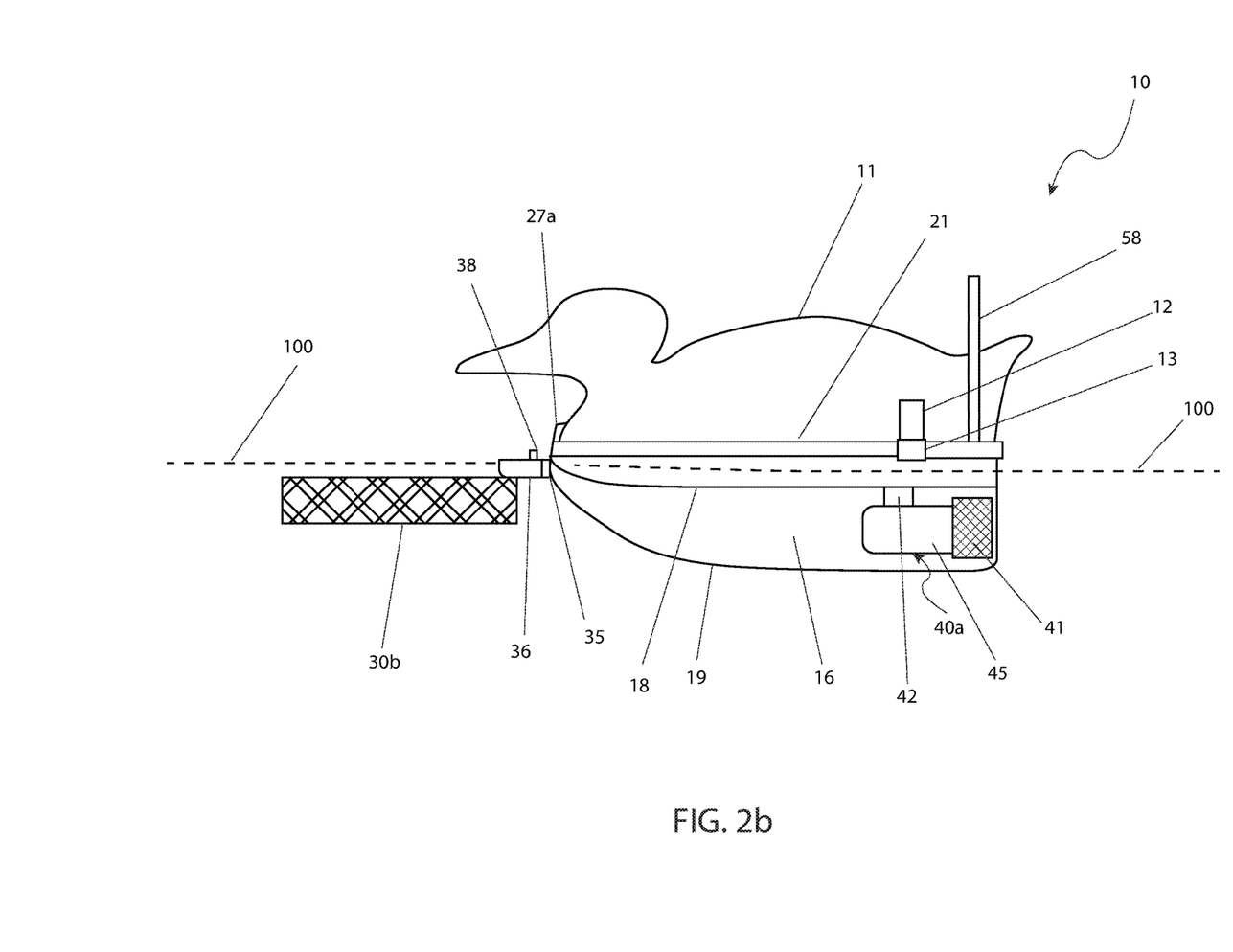
FIG. 2*b* is a side view of the remote control decoy 10 being configured with a second retrieval assembly 30*b* portion, according to an embodiment of the present invention.
Figure 2C:
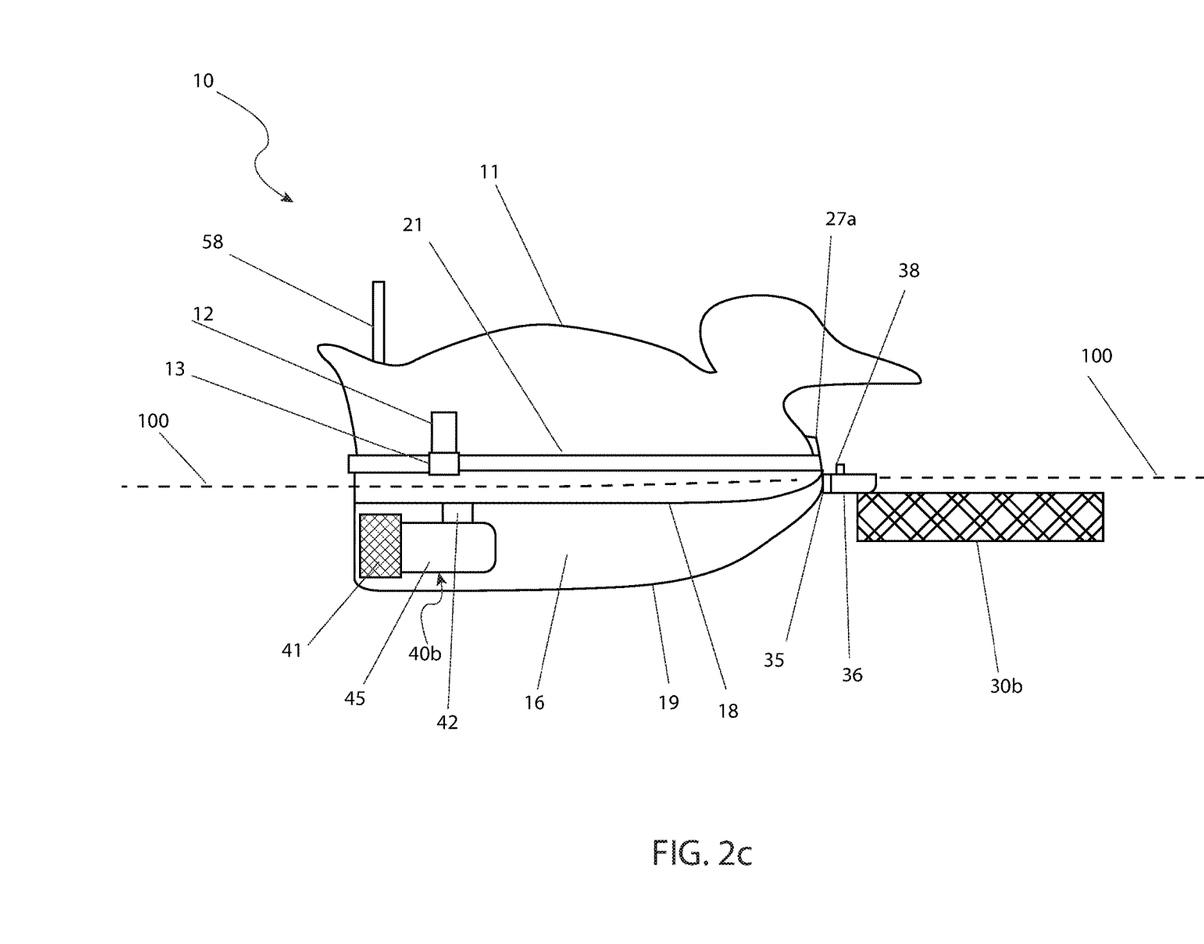
FIG. 2*c* is an opposite side view of FIG. 2*b* of the remote control decoy 10 being configured with a second retrieval assembly 30*b* portion, according to an embodiment of the present invention.

Referring now to FIGS. 2a, 2b and 2c, side views of the apparatus 10 depicting first retrieval assembly 30a and second retrieval assembly 30b portions, FIGS. 2a and 2b, and the opposite side view of FIG. 2b of the apparatus 10, FIG. 2c, respectively, according to respective embodiments of the present invention, are disclosed. The front portion of the flotation device 16 provides a means of removable attachment of a first retrieval assembly 30a or a second retrieval assembly 30b, based upon a user's preferences and conditions presented by a water surface 100. The retrieval assemblies 30a, 30b are removably attached to the flotation device 16 via engagement of a post portion 35 of the flotation device 16, and a correspondingly shaped socket portion 36 integrated into a rear portion of each retrieval assembly 30a, 30b (also see FIG. 4).

The arm portions 31a, 31b of each retrieval assembly 30a, 30b are permanently attached to the aforementioned socket portion 36 and are arranged in a divergent arcuate manner along a horizontal plane to jointly form a semi-circular shape. The arms 31a, 31b are to provide a frontal opening capable of receiving the downed waterfowl. The arms 31a, 31b are to be made using an open mesh expanded metal material which allows water to flow through as the apparatus 10 moves across the water surface 100.

As seen in FIG. 2a, the retrieval assembly socket 36 is affixed to a bottom rear surface of the first retrieval assembly 30a so as to position the arm portions 31a, 31b of the first retrieval assembly 30a above the water surface 100, thereby providing above the water surface 100 retrieval of waterfowl. In a similar manner as seen in FIGS. 2b and 2c the socket portion 36 is mounted in a vertically offset manner of the second retrieval assembly 30b along a top surface so as to position the arm portions 31a, 31b below the water surface 100, thereby providing below the water surface 100 retrieval of waterfowl.

Figure 3:
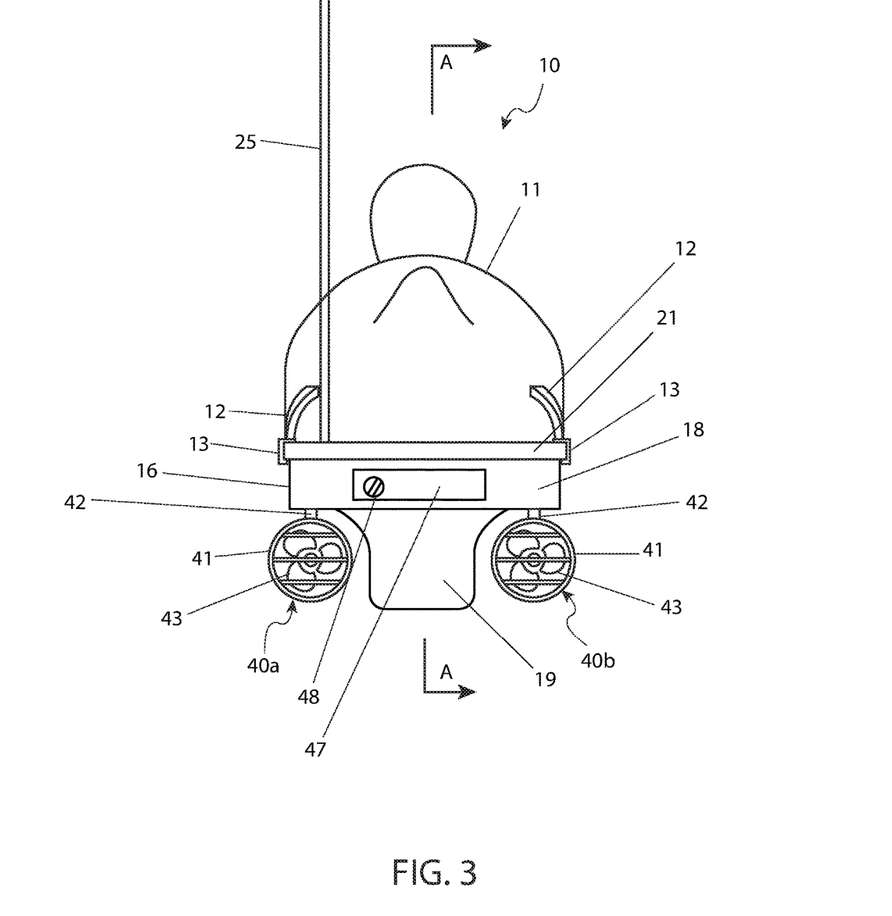
FIG. 3 is a rear view of the remote control decoy 10, according to an embodiment of the present invention.

Referring now to FIG. 3, a rear elevation view of the apparatus 10 according to an embodiment of the present invention, is disclosed. As seen here, attachment of a rear portion of the shell 11 to the flotation device 16 is accomplished via the straps 12. A top end portion of each strap 12 is embedded or otherwise affixed to the shell 11 along a side surface. The straps 12 are envisioned to be made of a stretchable and flexible material such as rubber. Each strap 12 includes an integral strap hook portion 13 affixed to a lower end which enables attachment of the strap 12 to a latching rail portion 21 located along top side edge portions of the flotation device 16.

The lower hull section 19 of the flotation device 16 includes recessed concave side surfaces which act to provide clearance for the first propeller assembly 40a and second propeller assembly 40b along respective side portions. The lower hull section 19 also extends downwardly to a point between, and slightly below, that of the propeller assemblies 40a, 40b so as to act as a contact surface to allow the apparatus 10 to move smoothly across obstacles present within the water surface 100 such as weeds, sand, and the like.

The propeller assemblies 40a, 40b are located along a rear portion of the flotation device 16. During use, the primary function of the propeller assemblies 40a, 40b is to direct a flow of water in a rearward direction, thereby propelling the apparatus 10. The propeller assemblies 40a, 40b further include respective cylindrical motor housings 45 being attached to the lower hull section 19 via integrally-molded hollow motor mounts 42 which also act as conduits to route electrical wiring 82 to power the motors 44. Each propeller assembly 40a, 40b includes a propeller 43 attached to a motor shaft 46. It is envisioned that the propeller assemblies 40a, 40b would provide both clockwise and anti-clockwise rotation of respective propellers 43 as directed by the remote control unit 50, thereby enabling forward and rearward movement of the apparatus 10 (see FIG. 5).

Each motor housing 45 further includes a cage portion 41 and an internal direct current (DC) electric motor 44. The cage portion 41 is to be integral to the motor housing 45 and surrounds the propeller 43 to deter debris from entering and seizing the blades. The rear of the motor housing 435 houses the motor 44 and the motor shaft 46.

Figure 4:
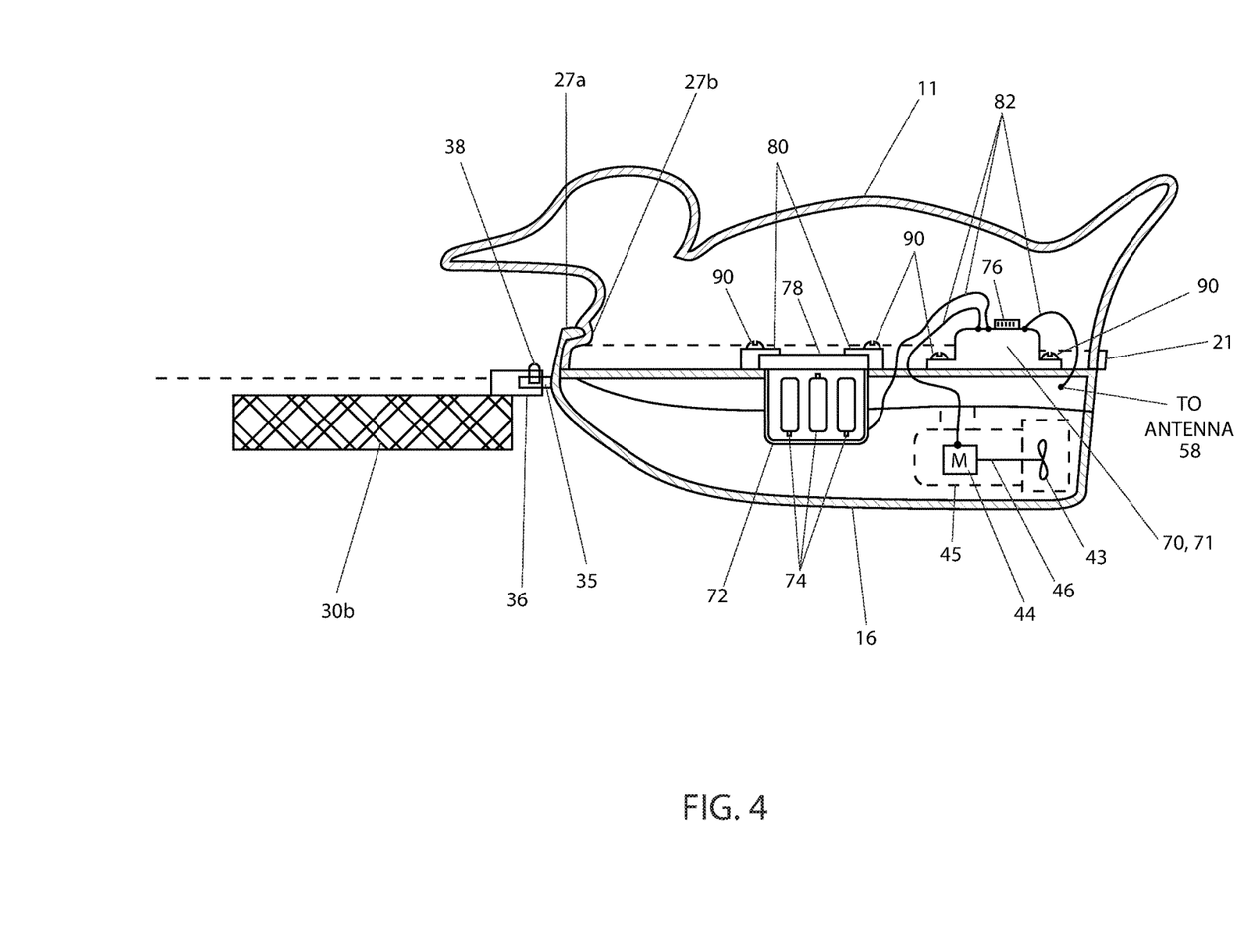
FIG. 4 is a sectional view of the remote control decoy 10 taken along section line A-A (see FIG. 3), according to an embodiment of the present invention; and, FIG. 5 is a perspective view of a remote control unit portion 50, according to an embodiment of the present invention.
Figure 5:
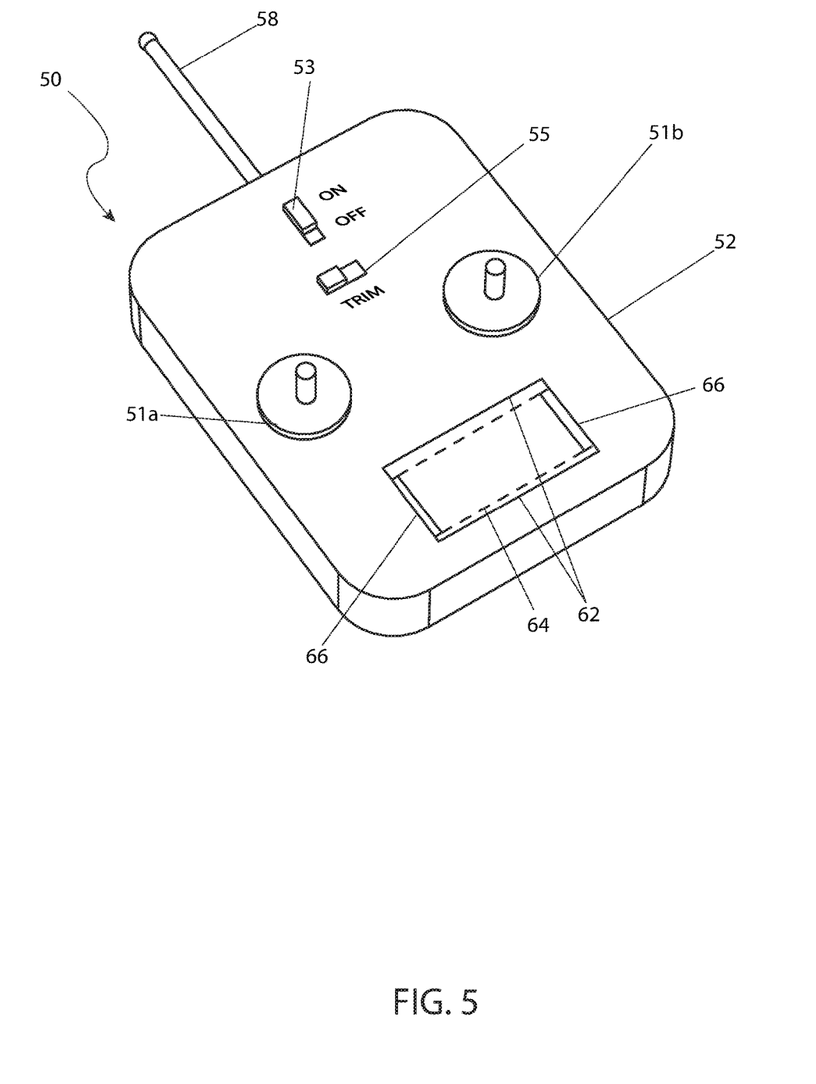

The upper hull section 18 of the apparatus 10 includes an upwardly protruding antenna 25 which receives a wireless signal 60 form the remote control unit 50 (see FIG. 5). The antenna 25 in turn conducts the wireless signal 60 to an internal receiver/controller module 70 located within the flotation device 16 (see FIG. 4).

The upper hull section 18 includes a weight compartment 47 along a rear surface, as seen here. The weight compartment 47 enables a user to add weight to a rear portion of the apparatus 10 so as to obtain a desired attitude of the apparatus 10 while upon the water surface 100, as desired. The weight compartment 47 includes a latching door portion 48 to effectively retain the weights within.

Referring now to FIG. 4, a sectional view of the apparatus 10 taken along section line A-A (see FIG. 3), according to an embodiment of the present invention, is disclosed. The flotation device 16 provides a housing function to onboard equipment to power and control the motors 44, thereby enabling motioning of the apparatus 10 across a water surface 100. The flotation device 16 includes the antenna 25, a receiver/controller module 70, a battery compartment 72 containing at least one (1) battery 74, and a power switch 76. The receiver/controller module 70 includes all electrical and electronic equipment needed to receive and process the wireless signal 60 transmitted from the remote control unit 50. The receiver/controller module 70 includes circuit boards, relays, software, and an integral decoy power switch 76, all within a plastic module housing 71. The receiver/controller module 70 is in electrical communication with the antenna 25, the motors 44, and the batteries 74 via wiring 82. The module housing portion 71 of the receiver/controller module 70 is envisioned to be waterproof and to be mounted to a top surface of the flotation device 16 via a plurality of fasteners 90 such as screws. The battery compartment 72 includes a removably attached battery compartment lid 78 being secured to the battery compartment 72, in a waterproof manner, via a pair of opposing battery compartment latches 80. The battery compartment latches 80 are envisioned to be swivel-type devices which rotate upon fasteners 90 and apply a force onto the battery compartment lid 78; however, it is understood that other designs of the battery compartment lid 78 and latches 80 may be utilized with equal benefit, and as such should not be interpreted as a limiting factor of the apparatus 10.

The shell clip 27a is illustrated here in an engaged state within the corresponding clip detent portion 27b of the shell 11.

The second retrieval assembly 30b is shown here being mounted to the flotation device 16 via engagement of the rectangular post 35 with the socket 36 portion in a non-rotating fashion, and being secured using a cylindrical locking pin 38, envisioned to be a quick-disconnect pin, or equivalent hardware device.

Referring now to FIG. 5, a top view of a remote control unit portion 50 of the apparatus 10, according to an embodiment of the present invention, is disclosed. The apparatus 10 is controlled wirelessly by the user via the remote control unit 50. The remote control unit 50 is capable of being manipulated by an operator on land or upon the water surface 100. The remote control unit 50 is envisioned to provide similar functions as, and have similar construction and materials, as a conventional remote controller (RC) such as those used to control RC cars, RC boats, and the like. The remote control unit 50 provides a rectangular hand-held remote control housing 52 which includes along a front surface, a first propeller control 51a, a second propeller control 51b, a remote control power switch 53, a trim control 55, and a mobile telephone compartment 62. The remote control housing 52 also includes a controller antenna 58 which extends from a top surface. The remote control unit 50 also provides expected internal components such as, but not limited to: batteries, circuit boards, an RF signal transmitter, and the like.

The first 40a and a second 40b propeller assemblies are independently controlled by the user by manipulating the first 51a and second 51b propeller controls, respectively. The propeller controls 51a, 51b preferably take the form of joystick devices. When desired, the user may activate the power switch 53 to energize the remote control unit 50. The hunter may then use the propeller controls 51a, 51b to control the speed and direction of the propeller assemblies 40a, 40b, thereby motioning the apparatus 10 to a desirable location and position. In like manner, the trim control 55 may also be used to control the first 40a and a second 40b propeller assemblies to provide directional manipulation of apparatus 10, if desired. The trim control 55 is envisioned to be a toggle-type proportional switching device having right and left directional indicators.

The remote control unit 50 is in wireless communication with the previously described receiver/control module portion 70 of the flotation device 16. The remote control unit 50 transmits a wireless signal 60 to the receiver/control module portion 70 via an internal transmitter and the module antenna 58. The wireless signal 60 is envisioned to be a radio frequency (RF) type signal; however, other signal types and frequency bands may be utilized with equal benefit, and as such should not be interpreted as a limiting factor of the apparatus 10 (also see FIG. 1).

The remote control unit 50 also provides a means to removably mount a user's mobile telephone 64 along the front surface thereof via a recessed and correspondingly shaped integral mobile telephone compartment 62. A mobile telephone 64 is capable of being retained within the mobile telephone compartment 62 via opposing clips 66 which mechanically grip side surfaces of the mobile telephone 64.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed and utilized as indicated in FIG. 1.

The method of preparing the apparatus 10 for use may be achieved by performing the following steps: procuring a model of the apparatus 10 having a desired shell design 11; installing a fresh set of batteries 74 into the flotation device 16 and the remote control housing 52; activating the apparatus 10 by switching the controller power switch 53 and the decoy power switch 76 to respective "on" positions; assembling the shell 11 to the flotation device 16 by engaging the shell clip 27a into the shell detent 27b; positioning the lower edge of the shell 11 upon the upper edge of the flotation device 16; securing the shell 11 to the flotation device 16 together by extending and attaching the straps 12 to the latching rail 21 using the strap hook portions 13; preparing the apparatus 10 for above water level retrieval of downed waterfowl by attaching the first retrieval assembly 30a to the lower hull section 19; engaging the post 35 and socket 36 portions; securing the first retrieval assembly 30a to the flotation device 16 by inserting the locking pin 38 through the post 35 and socket 36 portions; utilizing the latching door portion 48 of the weight compartment 47 to add weights to obtain a level condition of the apparatus 10 upon the water surface 100; and, inserting a mobile telephone 64, if desired, into the mobile telephone compartment 62. The apparatus 10 is now ready for use.

The method of utilizing the apparatus 10 may be achieved by performing the following steps: placing the apparatus 10 upon a water surface 100 such as a pond, lake, river, or the like; luring airborne waterfowl to the apparatus 10 by motioning the apparatus 10 using the first propeller control 51a, the second propeller control 51b, and the trim control 55, to a desired location upon the water surface 100; experiencing a waterfowl hunting activity; retrieving downed waterfowl by motioning the apparatus 10 such that the arm portions 31a, 31b of the first retrieval assembly 30a surround a downed waterfowl; motioning the apparatus 10 and entrapped waterfowl toward the hunter; utilizing the apparatus 10 to retrieve static decoys as needed; repeating the retrieving steps until all downed waterfowl and static decoys have been collected; and, benefiting from remotely deploying a decoy and retrieving waterfowl while minimizing the need to use a boat or a dog, afforded a user of the present invention 10.

Alternately, the apparatus 10 may be configured with the second retrieval assembly 30b to provide below-water-level retrieval of downed waterfowl, if desired.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A decoy, comprising:
a flotation device having an upper hull and a lower hull having a decoy power source secured therein;
a shell attachable to an upper surface of said flotation device, having a clip detent formed within a center front end thereof and a camera mount superjacent to said clip detent;
a first propeller assembly secured within said upper hull;
a second propeller assembly secured within said upper hull and positioned on an opposing rear perimeter end of said upper hull from said first propeller assembly;
a retrieval assembly attachable to a front center location of said upper hull, capable of being positioned above a water line;
a receiver control module, secured upon said upper surface of said flotation device and beneath said shell, in electrical communication with a decoy power source, said first propeller assembly, and said second propeller assembly; and,
a remote control having a remote control power source said remote control comprising:
a housing having a front surface and retaining said remote control power source therein, being in electrical communication with at least one circuit board and an RF transmitter;
a first propeller control secured upon said front surface in electrical communication with said at least one circuit board;
a second propeller control secured upon said front surface in electrical communication with said at least one circuit board and adjacent said first propeller control;
a power switch in electrical communication with said at least one circuit board;
a trim control in electrical communication with said at least one circuit board;
an antenna secured upon a top surface of said housing and in electrical communication with said at least one circuit board;
a mobile telephone compartment within said front face and subjacent said first propeller control and said second propeller control; and,
a pair of clips secured opposite each other within said mobile telephone compartment and adjacent a perimeter edge of said mobile telephone compartment;
wherein when said remote control is activated, said first propeller control, said second propeller control, and said trim control enable wireless communication with said first propeller assembly and said second propeller assembly via a wireless signal;
wherein said wireless signal is generated by said RF transmitter and transmitted by said antenna to said receiver control module in response to data from said at least one circuit board, thereby permitting control of a given speed, direction, and trim of said decoy;
wherein a mobile telephone is capable of being removably secured within said mobile telephone compartment by said pair of clips;
said flotation device comprising:
a pair of straps each having a top end secured within opposing rear perimeter sides of said shell;
a latching rail located along a top side edge portion said upper hull; a pair of strap hooks integral with a bottom end of each strap;
a shell clip projecting perpendicularly from a front end of said upper surface of said flotation device correspondingly shaped to said clip detent;
a post subjacent to said shell clip and projecting perpendicularly from a front end of said lower hull; and,
an antenna projecting from a rear upper surface of said flotation device and in electrical communication with said receiver control module;
wherein each strap hook of said pair of strap hooks removably secures said shell to said flotation device when each said strap hook is secured to an exterior edge portion of said latching rail; and,
wherein said shell clip further removably secures said shell to said flotation device when said shell clip is engaged within said clip detent; and,
wherein said remote control is capable of being in wireless communication with said receiver control module to selectively control said first propeller assembly and said second propeller assembly.

2. The decoy of claim 1, wherein said first propeller assembly comprises:
a motor mount secured beneath said upper hull subjacent said receiver control module;
a motor housing secured subjacent and perpendicular to said motor mount comprising:
a motor in electrical communication with said receiver control module;
a motor shaft having a first end in mechanical communication with said motor and a second end projecting through a distal end of said motor housing; and,
a propeller in mechanical communication with said motor shaft second end; and,
a cage secured over said distal end of said motor housing and over said propeller.

3. The decoy of claim 1, wherein said second propeller assembly comprises:
a motor mount secured upon said upper hull subjacent said receiver control module and adjacent said motor mount of said first propeller assembly;
a motor housing secured subjacent and perpendicular to said motor mount comprising:
a motor in electrical communication with said receiver control module;
a motor shaft having a first end in mechanical communication with said motor and a second end projecting through a distal end of said motor housing; and,
a propeller in mechanical communication with said motor shaft second end; and,
a cage secured over said distal end of said motor housing and over said propeller.

4. The decoy of claim 1, wherein said retrieval assembly comprises:
a right arm;
a left arm;
a socket; and,
a locking pin;
wherein said right arm and said left arm are positioned in an open divergent position at each distal end, each of which are biased towards each other;
wherein said right arm and said left arm are positioned in a closed divergent position at each proximal end, said divergent position secured superjacent to said socket;
wherein said socket is removably secured within said post by said locking pin; and,
wherein said retrieval assembly is capable of gathering and retrieving an item therein.

5. The decoy of claim 4, wherein said right arm and said left arm comprise an open mesh expanded metal material.

6. The decoy of claim 1, wherein said upper hull comprises a weight compartment secured within a rear portion thereof.

7. The decoy of claim 1, wherein said shell comprises a bird shape.

8. The decoy of claim 1, wherein said decoy power source comprises:
at least one battery, each secured within a housing having an opening subjacent to said upper surface of said flotation device; and,
a lid removably secured over said opening and superjacent said upper surface of said floatation device.

9. A decoy, comprising:
a flotation device having an upper hull and a lower hull having a decoy power source secured therein;
a shell attachable to an upper surface of said flotation device, having a clip detent formed within a center front end thereof and a camera mount superjacent to said clip detent;
a first propeller assembly secured within said upper hull;
a second propeller assembly secured within said upper hull and positioned on an opposing rear perimeter end of said upper hull from first propeller assembly;
a retrieval assembly attachable to a front center location of said upper hull capable of being positioned below a water line;
a receiver control module, secured upon said upper surface of said flotation device and beneath said shell, in electrical communication with a decoy power source, said first propeller assembly, and said second propeller assembly; and,
a remote control having a remote control power source therein, said remote control comprising:
a housing having a front surface retaining said remote control power source therein, being in electrical communication with at least one circuit board and an RF transmitter;
a first propeller control secured upon said front surface in electrical communication with said at least one circuit board;
a second propeller control secured upon said front surface in electrical communication with said at least one circuit board and adjacent said first propeller control;
a power switch in electrical communication with said at least one circuit board;
a trim control in electrical communication with said at least one circuit board;
an antenna secured upon a top surface of said housing and in electrical communication with said at least one circuit board;
a mobile telephone compartment within said front face and subjacent said first propeller control and said second propeller control; and,
a pair of clips secured opposite each other within said mobile telephone compartment and adjacent a perimeter edge of said mobile telephone compartment;
wherein when said remote control is activated, said first propeller control said second propeller control, and said trim control enable wireless communication with said first propeller assembly and said second propeller assembly via a wireless signal;
wherein said wireless signal is generated by said RF transmitter and transmitted by said antenna to said receiver control module in response to data from said at least one circuit board, thereby permitting control of a given speed, direction, and trim of said decoy;
wherein a mobile telephone is capable of being removably secured within said mobile telephone compartment by said pair of clips;
said flotation device comprising:
a pair of straps each having a top end secured within opposing rear perimeter sides of said shell;
a latching rail located along a top side edge portion of said upper hull;
a pair of strap hooks integral with a bottom end of each strap;
a shell clip projecting perpendicularly from a front end of said upper surface of said flotation device correspondingly shaped to said clip detent;

a post subjacent to said shell clip and projecting perpendicularly from a front end of said lower hull; and, an antenna projecting from a rear upper surface of said flotation device and in electrical communication with said receiver control module;

wherein each strap hook of said pair of strap hooks removably secures said shell to said flotation device when each said strap hook is secured to an exterior edge portion of said latching rail; and, wherein said shell clip further removably secures said shell to said flotation device when said shell clip is engaged within said clip detent; and, wherein said remote control is capable of being in wireless communication with said receiver control module to selectively control said first propeller assembly and said second propeller assembly.

10. The decoy of claim 9, wherein said first propeller assembly comprises:

a motor mount secured beneath said upper hull subjacent said receiver control module;

a motor housing secured subjacent and perpendicular to said motor mount comprising:

a motor in electrical communication with said receiver control module;

a motor shaft having a first end in mechanical communication with said motor and a second end projecting through a distal end of said motor housing; and, a propeller in mechanical communication with said motor shaft second end; and, a cage secured over said distal end of said motor housing and over said propeller.

11. The decoy of claim 9, wherein said second propeller assembly comprises:

a motor mount secured upon said upper hull subjacent said receiver control module and adjacent said motor mount of said first propeller assembly;

a motor housing secured subjacent and perpendicular to said motor mount comprising:

a motor in electrical communication with said receiver control module;

a motor shaft having a first end in mechanical communication with said motor and a second end projecting through a distal end of said motor housing; and, a propeller in mechanical communication with said motor shaft second end; and, a cage secured over said distal end of said motor housing and over said propeller.

12. The decoy of claim 9, wherein said retrieval assembly comprises:

a right arm;

a left arm;

a socket; and, a locking pin;

wherein said right arm and said left arm are positioned in an open divergent position at each distal end, each of which are biased towards each other;

wherein said right arm and said left arm are positioned in a closed divergent position at each proximal end, said divergent position secured subjacent to said socket;

wherein said socket is removably secured within said post by said locking pin; and, wherein said retrieval assembly is capable of gathering and retrieving an item therein.

13. The decoy of claim 12, wherein said right arm and said left arm comprise an open mesh expanded metal material.

14. The decoy of claim 9, wherein said upper hull comprises a weight compartment secured within a rear portion thereof.

15. The decoy of claim 9, wherein said shell comprises a bird shape.

16. The decoy of claim 9, wherein said decoy power source comprises:

at least one battery secured within a housing having an opening subjacent to said upper surface of said flotation device; and, a lid removably secured over said opening and superjacent said upper surface of said floatation device.

* * * * *